United States Patent
Shimizu et al.

(10) Patent No.: US 10,074,352 B2
(45) Date of Patent: Sep. 11, 2018

(54) ULTRASONIC WAVE GENERATION APPARATUS

(71) Applicant: Murata Manufacturing Co., Ltd., Nagaokakyo-shi, Kyoto-fu (JP)

(72) Inventors: Yasuhiro Shimizu, Nagaokakyo (JP); Akihiro Mitani, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 412 days.

(21) Appl. No.: 14/873,076

(22) Filed: Oct. 1, 2015

(65) Prior Publication Data

US 2016/0027424 A1 Jan. 28, 2016

Related U.S. Application Data

(63) Continuation of application No. PCT/JP2013/085194, filed on Dec. 27, 2013.

(30) Foreign Application Priority Data

Apr. 24, 2013 (JP) .................................. 2013-091269

(51) Int. Cl.
*H01L 41/09* (2006.01)
*H01L 41/053* (2006.01)
(Continued)

(52) U.S. Cl.
CPC ............ *G10K 9/125* (2013.01); *B06B 1/0603* (2013.01); *B06B 1/0611* (2013.01); *G10K 9/22* (2013.01); *B06B 1/0618* (2013.01); *G01S 7/521* (2013.01)

(58) Field of Classification Search
CPC ........ G10K 9/125; G10K 9/22; B06B 1/0603; B06B 1/0611; H01L 41/09; H01L 41/053; H01L 41/047
(Continued)

(56) References Cited

U.S. PATENT DOCUMENTS

| 4,700,177 A | 10/1987 | Nakashima et al. |
| 5,856,956 A | 1/1999 | Toki |

(Continued)

FOREIGN PATENT DOCUMENTS

| JP | 60-134700 A | 7/1985 |
| JP | 2011-228966 A | 11/2011 |

(Continued)

*Primary Examiner* — Thomas Dougherty
(74) *Attorney, Agent, or Firm* — Arent Fox LLP (57) ABSTRACT

An ultrasonic wave generation apparatus that includes an ultrasonic wave generation element having an inner space formed by bonding first and second vibrators so as to close off a through-hole or a groove provided in a frame body, and a connecting member that is bonded to the second vibrator supports the ultrasonic wave generation element and is electrically connected to at least one of the first and second vibrators. A ventilation hole that opens into a first side surface of the frame body and that allows the inner space to communicate with the exterior is provided in the frame body. When a direction parallel to the first main surface or the second main surface is a lengthwise direction, an outer side end portion of the ventilation hole in the lengthwise direction and an inner side end portion in the lengthwise direction of the connecting member do not match.

14 Claims, 7 Drawing Sheets

(51) Int. Cl.
  *G10K 9/125* (2006.01)
  *G10K 9/22* (2006.01)
  *B06B 1/06* (2006.01)
  *G01S 7/521* (2006.01)

(58) Field of Classification Search
  USPC .............................................. 310/340, 348
  See application file for complete search history.

(56) References Cited

U.S. PATENT DOCUMENTS

2006/0043843 A1* 3/2006 Sugiura ................. B06B 1/0629
                                                   310/348
2009/0086416 A1* 4/2009 Ishikawa ................... F04F 7/00
                                                   361/679.01
2013/0140956 A1   6/2013 Mitani et al.

FOREIGN PATENT DOCUMENTS

WO    WO 2012/026319 A1    3/2012
WO    WO 2013/051400 A1    4/2013

* cited by examiner

ULTRASONIC WAVE GENERATION APPARATUS

CROSS REFERENCE TO RELATED APPLICATIONS

The present application is a continuation of International application No. PCT/JP2013/085194, filed Dec. 27, 2013, which claims priority to Japanese Patent Application No. 2013-091269, filed Apr. 24, 2013, the entire contents of each of which are incorporated herein by reference.

FIELD OF THE INVENTION

The present invention relates to an ultrasonic wave generation apparatus in which plate-shaped first and second vibrators vibrate at opposite phases.

BACKGROUND OF THE INVENTION

Thus far, ultrasonic wave generation apparatuses have been used in rangefinding techniques and the like that employ ultrasonic waves.

For example, Patent Document 1, indicated below, discloses an ultrasonic wave generation apparatus that uses a piezoelectric vibrator. This ultrasonic wave generation apparatus includes a housing and an ultrasonic wave generation element disposed within the housing. The ultrasonic wave generation element has a frame body and plate-shaped first and second piezoelectric vibrators. A groove or a through-hole is formed in a central area of the frame body. To close off the groove or through-hole, the first piezoelectric vibrator is bonded to a first main surface of the frame body and the second piezoelectric vibrator is bonded to a second main surface that is opposite to the first main surface. The first piezoelectric vibrator and the second piezoelectric vibrator vibrate at opposite phases from each other, and as a result, the ultrasonic wave generation element vibrates in a buckling tuning-fork vibration mode. The ultrasonic wave generation apparatus disclosed in Patent Document 1 emits ultrasonic waves generated by the vibration of this ultrasonic wave generation element.

On the other hand, Patent Document 2, indicated below, discloses an electroacoustic transducer that uses a support body having a hollow structure. In this electroacoustic transducer, a part of each of main surfaces of the support body is constituted by an elastic material. Piezoelectric elements are bonded to outer side portions of the parts of both main surfaces of the support body that are constituted by the elastic material. In addition, an acoustic emission opening is formed in a side surface of the support body. This acoustic emission opening is formed as a through-hole that makes an inner space of the support body communicate with the exterior.

Patent Document 1: WO2012/026319
Patent Document 2: Japanese Unexamined Patent Application Publication No. 2011-228966

SUMMARY OF THE INVENTION

In the ultrasonic wave generation apparatus disclosed in Patent Document 1, the groove or through-hole of the frame body is closed off by the first and second piezoelectric vibrators. Accordingly, an inner space enclosed by the first and second piezoelectric vibrators and the frame body is sealed. As such, if the ultrasonic wave generation element is exposed to high temperatures during manufacture, such as when disposing the ultrasonic wave generation element within the housing, there is a risk that the ultrasonic wave generation element will be damaged due to the expansion of water vapor or the like within the inner space. To prevent such damage, providing a ventilation hole in the frame body to enable the inner space to communicate with the exterior is considered desirable. Specifically, providing a through-hole in a side surface of the frame body and using that through-hole as the ventilation hole can be considered. However, providing such a ventilation hole may lead to a drop in durability. For example, there is a risk of cracks being formed in the ultrasonic wave generation element or the like when stress acts thereon due to impacts from being dropped and so on.

Note that the acoustic emission opening in the electroacoustic transducer disclosed in Patent Document 2 is provided to emit sound waves produced within the support body, and is not provided as a ventilation hole for enabling the inner space of the support body to communicate with the exterior as described above.

It is an object of the present invention to provide an ultrasonic wave generation apparatus in which a ventilation hole that enables an interior space of an ultrasonic wave generation element to communicate with the exterior is provided in a frame body, and that does not easily experience a drop in durability.

An ultrasonic wave generation apparatus according to the present invention includes an ultrasonic wave generation element and a connecting member. The ultrasonic wave generation element has a frame body and plate-shaped first and second vibrators. The frame body has first and second main surfaces that are opposite to each other and a plurality of side surfaces. In the first and second main surfaces, one of a groove or a through-hole is provided in the first and second main surfaces. A plate-shaped first vibrator is bonded to the first main surface so as to close off the groove or the through-hole on the first main surface side of the frame body. A plate-shaped second vibrator is bonded to the second main surface so as to close off the groove or the through-hole on the second main surface side of the frame body. The ultrasonic wave generation element has an inner space formed by the groove or the through-hole and the first and second vibrators.

The connecting member is bonded to a surface of the second vibrator opposite to the surface of the second vibrator that is bonded to the second main surface of the frame body. The connecting member supports the ultrasonic wave generation element, and is electrically connected to at least one of the first and second vibrators.

In the present invention, a ventilation hole that has a part that opens into a first side surface of the plurality of side surfaces and that allows the inner space and an exterior to communicate is provided in the frame body. A direction of the first side surface that is parallel to the first main surface or the second main surface is taken as a lengthwise direction. In the first side surface, in the part of the ventilation hole that opens into the first side surface, a location furthest from a center of the first side surface in the lengthwise direction is taken as an outer side end portion. Meanwhile, a location closest to the center of the first side surface in the lengthwise direction is taken as an inner side end portion. The ventilation hole is provided so that, when viewed in plan view, the outer side end portion of the part of the ventilation hole that opens into the first side surface is in a position that does not overlap with the inner side end portion of the connecting member.

According to a specific aspect of the ultrasonic wave generation apparatus according to the present invention, the ventilation hole is provided so that, when viewed in plan view, the outer side end portion of the part that opens into the first side surface is in a position that is different from the center of the first side surface in the lengthwise direction and that does not overlap with the inner side end portion of the connecting member. Through this, stress acting on the frame body becomes extremely small, and a drop in durability can be almost completely prevented.

According to another specific aspect of the ultrasonic wave generation apparatus according to the present invention, the ventilation hole is provided so that the part that opens into the first side surface is covered by the connecting member when viewed from below. Through this, stress acting on the frame body becomes extremely small, and a drop in durability can be almost completely prevented.

According to yet another specific aspect of the ultrasonic wave generation apparatus according to the present invention, the ultrasonic wave generation apparatus further includes a housing that houses the ultrasonic wave generation element and that has a sonic wave emission opening, and a frequency of a resonance within the ventilation hole is different from a frequency of resonance, produced by sonic waves emitted due to vibration of the first and second vibrators, that takes the sonic wave emission opening as an open end. Through this, a drop in the sound pressure of ultrasonic waves emitted from the ultrasonic wave generation apparatus can be reduced.

According to still another specific aspect of the ultrasonic wave generation apparatus according to the present invention, the ultrasonic wave generation element generates ultrasonic waves in a buckling tuning-fork vibration mode in which the first vibrator and the second vibrator vibrate at opposite phases.

In the ultrasonic wave generation apparatus according to the present invention, the ventilation hole that allows the inner space of the ultrasonic wave generation element to communicate with the exterior is provided in the frame body, and thus the ultrasonic wave generation element can be prevented from being damaged even if the ultrasonic wave generation element is exposed to high temperatures and water vapor or the like within the inner space has expanded. Furthermore, because the ventilation hole is provided so as to be in a specific positional relationship with the connecting member, cracks will not form in the ultrasonic wave generation element even when stress caused by a drop impact or the like acts thereon. Accordingly, a drop in the durability of an ultrasonic wave generation apparatus having a ventilation hole can be prevented.

BRIEF DESCRIPTION OF THE DRAWINGS

FIG. 12($a$) to FIG. 12($d$) are each side views for illustrating variations on a shape of a ventilation hole in an ultrasonic wave generation apparatus according to the present invention.

DETAILED DESCRIPTION OF THE PREFERRED EMBODIMENTS

The present invention will be made clear hereinafter through descriptions of a specific embodiment of the present invention with reference to the drawings.

Figure 1:
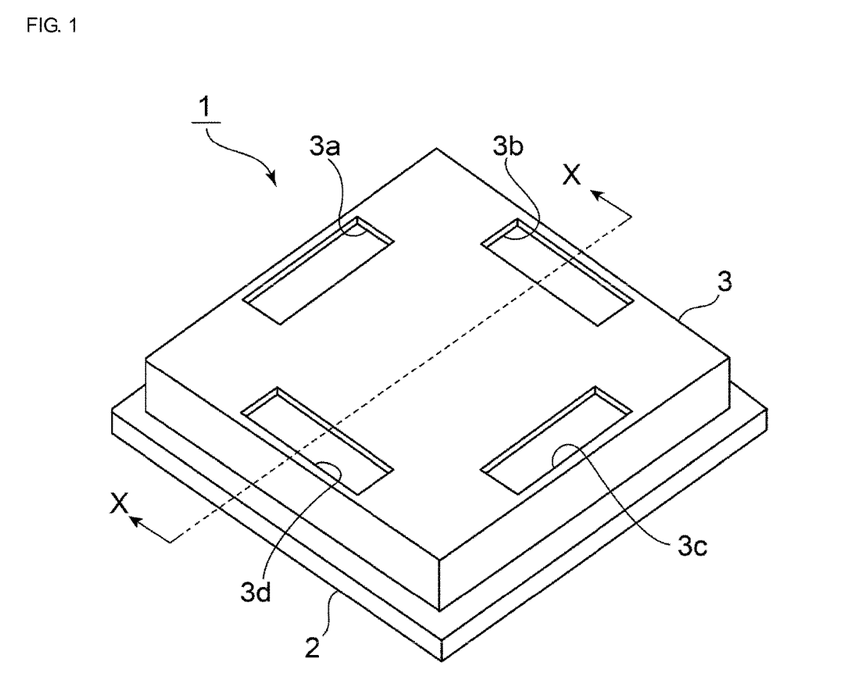
FIG. 1 is a perspective view illustrating the external appearance of an ultrasonic wave generation apparatus according to an embodiment of the present invention.
Figure 2:
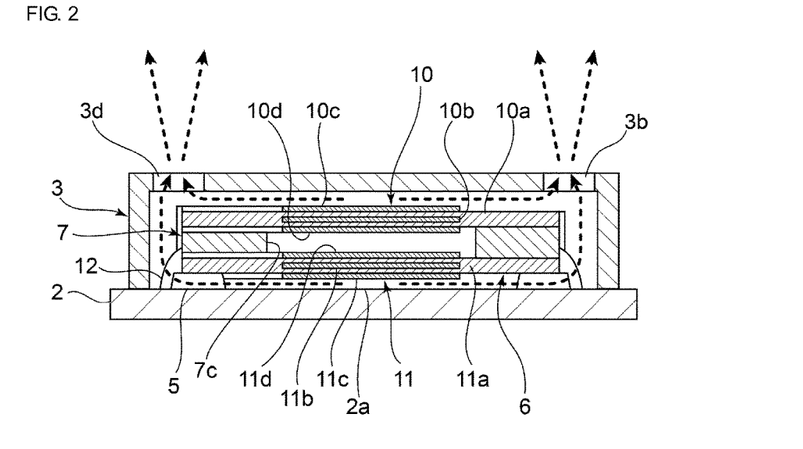
FIG. 2 is a cross-sectional view of an ultrasonic wave generation apparatus according to an embodiment of the present invention, taken along an X-X line indicated in FIG. 1.
Figure 3:
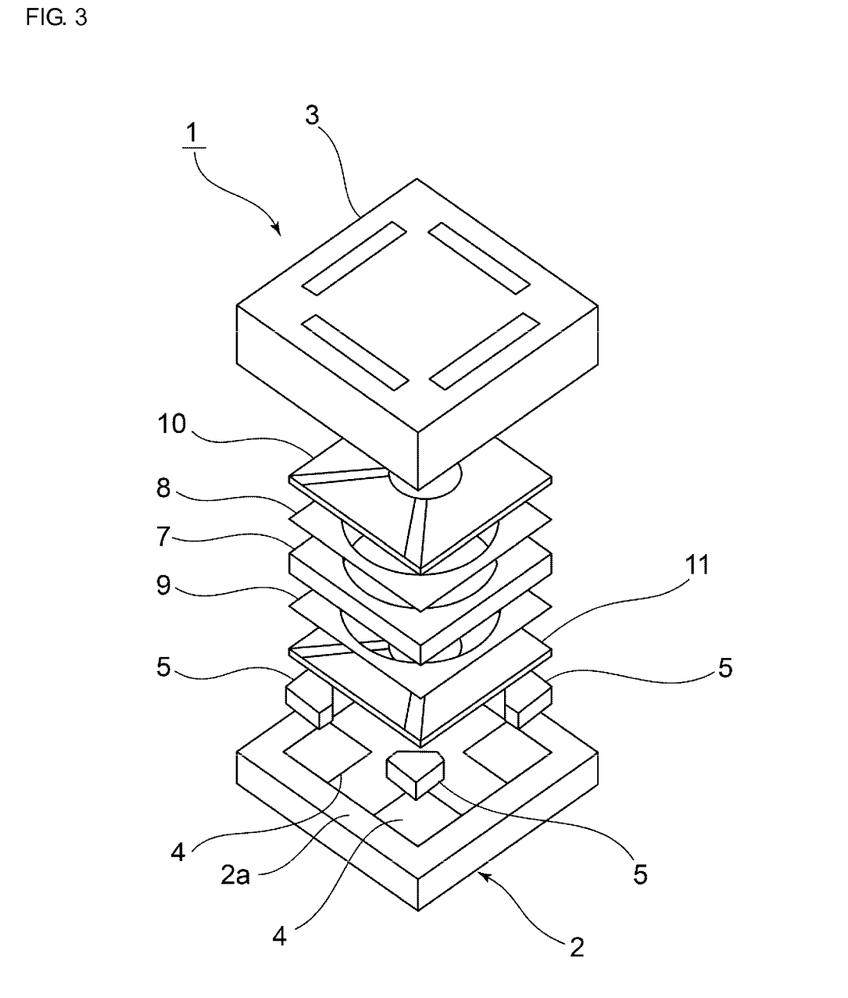
FIG. 3 is an exploded perspective view of an ultrasonic wave generation apparatus according to an embodiment of the present invention.

FIG. 1 is a perspective view illustrating the external appearance of an ultrasonic wave generation apparatus 1 according to an embodiment of the present invention. FIG. 2 is a cross-sectional view of the ultrasonic wave generation apparatus 1, taken along an X-X line indicated in FIG. 1. FIG. 3 is an exploded perspective view of the ultrasonic wave generation apparatus 1.

The ultrasonic wave generation apparatus 1 includes a plate-shaped base board 2 and a cap member 3 having an opening that opens downward.

As illustrated in FIG. 1 and FIG. 2, the cap member 3 is fixed upon the base board 2, and a housing is formed by the base board 2 and the cap member 3. An ultrasonic wave generation element 6, which will be mentioned later, is housed within a space enclosed by the base board 2 and the cap member 3, or in other words, within the housing. The base board 2 is a ceramic board constituted by alumina, a glass epoxy board, or the like, for example.

As illustrated in FIG. 1, a plurality of sonic wave emission openings 3$a$ to 3$d$ are provided in a top surface of the cap member 3.

As illustrated in FIG. 3, a plurality of electrode lands 4 are provided on a top surface 2$a$ of the stated base board 2. The electrode lands 4 are electrically connected to terminal electrodes (not shown) provided in a bottom surface of the base board 2 by through-hole electrodes or the like provided in the base board 2. The ultrasonic wave generation element 6 is mechanically bonded to the plurality of electrode lands 4 with a plurality of connecting members 5 interposed therebetween, and is also electrically connected thereto. As mentioned above, the connecting members 5 have a function of mechanically supporting the ultrasonic wave generation element 6 on the base board 2 and a function of electrically connecting the ultrasonic wave generation element 6 to the terminal electrodes (not shown).

To provide a gap between the top surface 2a of the base board 2 and a lower surface of the ultrasonic wave generation element 6, it is necessary for the connecting members 5 to have a certain degree of thickness, as illustrated in FIG. 2. The connecting members 5 are formed from a metal material, for example. Ultimately, a material aside from metal, such as a conductive resin material or the like, may be employed as well, as long as the connecting members 5 have the function of mechanically supporting the ultrasonic wave generation element 6 on the base board 2 and the function of electrically connecting the ultrasonic wave generation element 6 to the terminal electrodes (not shown). In the present embodiment, the connecting members 5 are formed from a metal material, and the connecting members 5 and the ultrasonic wave generation element 6 are bonded by a conductive adhesive 12. Note that the connecting members 5 and the ultrasonic wave generation element 6 may be bonded using solder instead of the conductive adhesive 12. Alternatively, the connecting members 5 may be formed of a material having adhesive properties, such as an epoxy resin-based conductive adhesive or the like.

Figure 4:
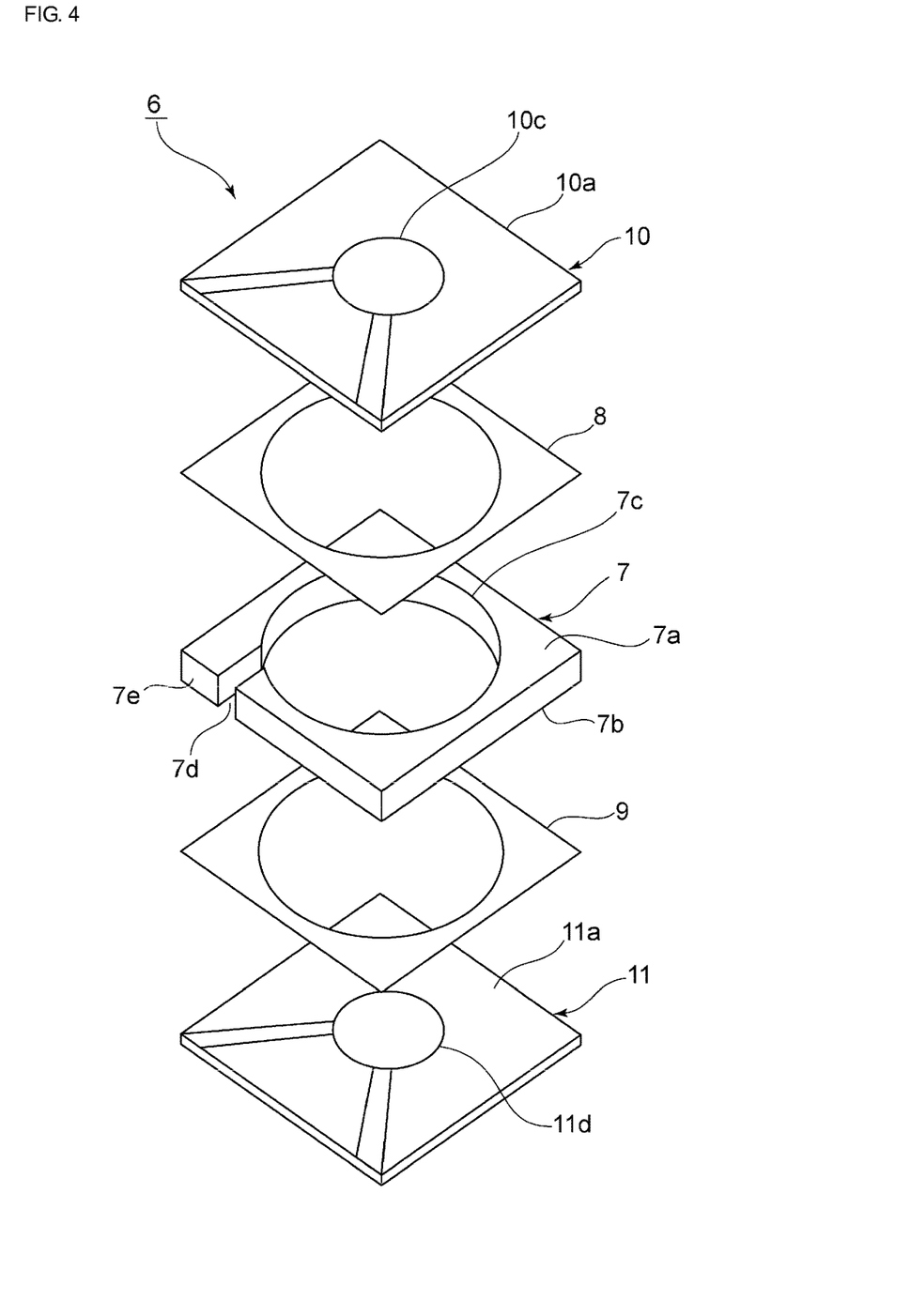
FIG. 4 is an exploded perspective view of an ultrasonic wave generation element included in an ultrasonic wave generation apparatus according to an embodiment of the present invention.

The ultrasonic wave generation element 6 will be described in detail with reference to FIG. 2 and FIG. 4. FIG. 4 is an exploded perspective view of the ultrasonic wave generation element 6.

The ultrasonic wave generation element 6 includes a frame body 7. The frame body 7 has a first main surface 7a, a second main surface 7b that is opposite to the first main surface 7a, and four side surfaces including a side surface 7e serving as a first side surface. The frame body 7 is formed from a ceramic material such as alumina, a synthetic resin such as glass epoxy, or the like, for example. A through-hole 7c that penetrates from the first main surface 7a toward the second main surface 7b is provided in a central area of the frame body 7. A ventilation hole 7d is provided in the frame body 7 spanning from the through-hole 7c to the side surface 7e. In the present embodiment, the ventilation hole 7d penetrates from the first main surface 7a toward the second main surface 7b.

Figure 5:
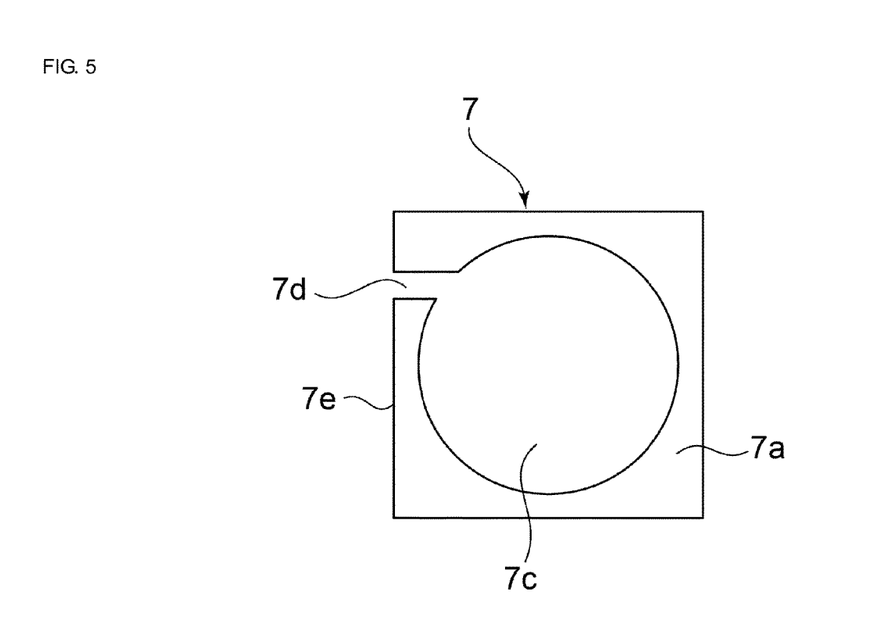
FIG. 5 is a plan view of a frame body included in an ultrasonic wave generation apparatus according to an embodiment of the present invention.

FIG. 5 is a plan view of the frame body 7. As illustrated in FIG. 5, the ventilation hole 7d connects the through-hole 7c and the side surface 7e of the frame body 7 in a linear shape.

A first piezoelectric vibrator 10 is bonded to the first main surface 7a of the frame body 7 with a frame-shaped adhesive layer 8 interposed therebetween so as to close off the through-hole 7c. A second piezoelectric vibrator 11 is bonded to the second main surface 7b of the frame body 7 with a frame-shaped adhesive layer 9 interposed therebetween so as to close off the through-hole 7c.

The first and second piezoelectric vibrators 10 and 11 are bimorph-type piezoelectric vibrators having plate shapes. By bonding the first and second piezoelectric vibrators 10 and 11 to the first and second main surfaces 7a and 7b of the frame body 7, respectively, a part of the frame body 7 where the stated through-hole 7c is provided is sealed from above and below. Accordingly, the ultrasonic wave generation element 6 has an inner space formed by the through-hole 7c and the first and second piezoelectric vibrators 10 and 11. The stated ventilation hole 7d is provided in the frame body 7 in order to enable the inner space of the ultrasonic wave generation element 6 to communicate with the exterior. Through this, even if the ultrasonic wave generation element 6 is exposed to high temperatures during manufacture, such as when mounting the ultrasonic wave generation element 6 on the base board 2, and water vapor or the like within the inner space has expanded as a result, the ultrasonic wave generation element 6 can be prevented from being damaged.

The first piezoelectric vibrator 10 has a rectangular plate-shaped piezoelectric plate 10a. The piezoelectric plate 10a has two piezoelectric material layers formed of piezoelectric ceramics such as PZT, and an inner electrode 10b disposed between the two piezoelectric material layers. An exciting electrode 10c is provided in a central area of a top surface of the piezoelectric plate 10a. The exciting electrode 10c is provided so as to overlap with the inner electrode 10b, with the upper-side piezoelectric material layer interposed therebetween. An exciting electrode 10d is provided in a central area of a bottom surface of the piezoelectric plate 10a. The exciting electrode 10d is provided so as to overlap with the inner electrode 10b, with the lower-side piezoelectric material layer interposed therebetween. The piezoelectric material layer between the exciting electrode 10c and the inner electrode 10b and the piezoelectric material layer between the inner electrode 10b and the exciting electrode 10d are polarized in the same direction relative to a thickness direction. The exciting electrodes 10c and 10d are formed of a metal such as Ag, Pd, or the like, and an alloy thereof.

The second piezoelectric vibrator 11 has a rectangular plate-shaped piezoelectric plate 11a. The piezoelectric plate 11a has two piezoelectric material layers formed of piezoelectric ceramics such as PZT, and an inner electrode 11b disposed between the two piezoelectric material layers. An exciting electrode 11c is provided in a central area of a bottom surface of the piezoelectric plate 11a. The exciting electrode 11c is provided so as to overlap with the inner electrode 11b, with the lower-side piezoelectric material layer interposed therebetween. An exciting electrode 11d is provided in a central area of a top surface of the piezoelectric plate 11a. The exciting electrode 11d is provided so as to overlap with the inner electrode 11b, with the upper-side piezoelectric material layer interposed therebetween. The piezoelectric material layer between the exciting electrode 11c and the inner electrode 11b and the piezoelectric material layer between the inner electrode 11b and the exciting electrode 11d are polarized in the same direction relative to the thickness direction. The exciting electrodes 11c and 11d are formed of a metal such as Ag, Pd, or the like, and an alloy thereof. Note that the piezoelectric material layers of the second piezoelectric vibrator 11 are polarized in the opposite direction to the piezoelectric material layers of the first piezoelectric vibrator 10, in the thickness direction. Accordingly, the second piezoelectric vibrator 11 is configured to vibrate at a phase opposite to the phase of the first piezoelectric vibrator 10.

Although the foregoing describes the piezoelectric material layers as being formed from PZT-based ceramic material, the piezoelectric material layers are not limited thereto. The piezoelectric material layers may be formed from a non-leaded piezoelectric ceramic material such as a potassium sodium niobate-based ceramic material, an alkali niobate-based ceramic material, or the like.

In the ultrasonic wave generation element 6, the stated first piezoelectric vibrator 10 and second piezoelectric vibrator 11 are driven so as to vibrate at opposite phases. As a result, the ultrasonic wave generation element 6 vibrates in a buckling tuning-fork vibration mode. This vibration generates ultrasonic waves upward and downward from the ultrasonic wave generation element 6. The generated ultrasonic waves propagate in the directions indicated by the broken line arrows in FIG. 2, and are emitted to the exterior from the sonic wave emission openings 3a to 3d.

A feature of the ultrasonic wave generation apparatus 1 according to the present embodiment is that the ventilation hole 7d and the connecting members 5 are in a specific positional relationship, and as a result, it is difficult for the durability of the apparatus to drop even though the ventilation hole 7d is provided. This will be described in detail with reference to FIG. 6 to FIG. 11.

Figure 6:
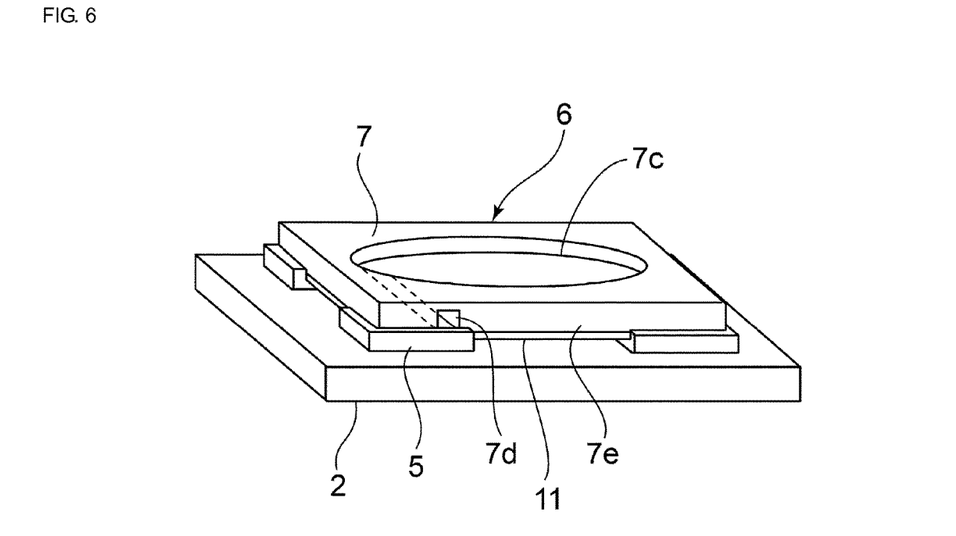
FIG. 6 is a general perspective view illustrating a positional relationship between a ventilation hole and a connecting member in an ultrasonic wave generation apparatus according to an embodiment of the present invention.

FIG. 6 is a general perspective view illustrating a positional relationship between the ventilation hole 7d and the connecting members 5 in the ultrasonic wave generation apparatus 1. As illustrated in FIG. 6, the ventilation hole 7d opens into the aforementioned side surface 7e of the frame body 7. The cap member 3, the first piezoelectric vibrator 10, and the conductive adhesive 12 are not illustrated in FIG. 6. When viewing the ultrasonic wave generation apparatus 1 in plan view, the ventilation hole 7d is provided in a region of the side surface 7e where a connecting member 5 is located therebelow. Accordingly, the part of the ventilation hole 7d that opens into the side surface 7e is supported by the connecting member 5 located therebelow.

The vicinity of the part of the ventilation hole 7d that opens into the side surface 7e is an area that is susceptible to stress from impacts caused by drops of the frame body 7 and the like. Accordingly, depending on the position where the ventilation hole 7d is provided, there is a risk of cracks forming in the area in the vicinity of the part of the ventilation hole 7d that opens into the side surface 7e due to stress from impacts caused by drops or the like.

As opposed to this, according to the present embodiment, when viewing the ultrasonic wave generation apparatus 1 in plan view, the ventilation hole 7d is provided in a region of the side surface 7e where a connecting member 5 is located therebelow. Accordingly, because the part of the ventilation hole 7d that opens into the side surface 7e is supported by the connecting member 5 located therebelow, a drop in durability can be prevented even when the ventilation hole 7d is provided.

Figure 7:
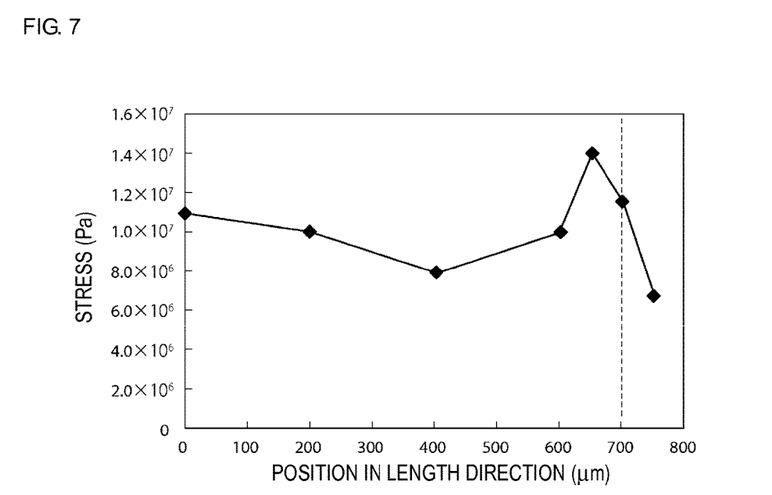
FIG. 7 is a diagram illustrating a relationship between a position of a ventilation hole in a lengthwise direction of a first side surface of a frame body and stress acting thereon during a drop impact.

The inventors of the present invention examined a relationship between the position where the ventilation hole 7d opens into the side surface 7e and stress acting on the frame body 7 by an impact caused by a drop. The results are illustrated in FIG. 7. A lengthwise direction position along the horizontal axis in FIG. 7 represents the position, in the lengthwise direction of the side surface 7e of the frame body 7, of the part of the ventilation hole 7d that opens into the side surface 7e. The vertical axis in FIG. 7 represents the magnitude of the stress acting on the frame body 7. Note that a direction, in the side surface 7e, that is parallel to the first main surface 7a or the second main surface 7b is taken as the lengthwise direction. The lengthwise direction position along the horizontal axis in FIG. 7 refers to a distance from a center position of the side surface 7e in the lengthwise direction to a center position of the part of the ventilation hole 7d that opens into the side surface 7e in the lengthwise direction.

Figure 8:
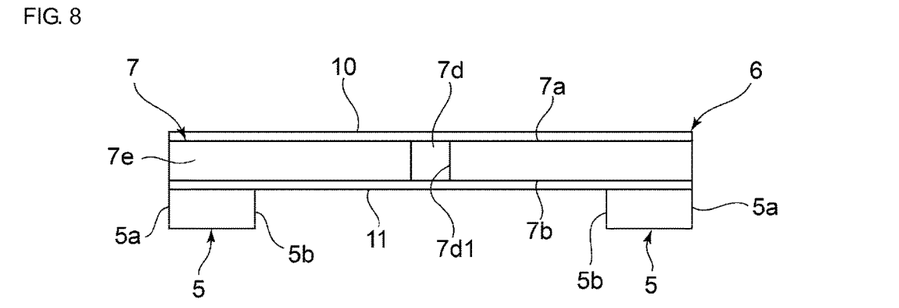
FIG. 8 is a side view illustrating a positional relationship between a ventilation hole and connecting members in a lengthwise direction of a first side surface of a frame body according to a first working example of the present invention.

The stated lengthwise direction position will be described using a first working example, illustrated in FIG. 8, as an example. FIG. 8 is a diagram illustrating a positional relationship between the ventilation hole 7d and connecting members 5 and 5 in the lengthwise direction of the side surface 7e of the frame body 7, according to the first working example. In FIG. 8, the first and second piezoelectric vibrators 10 and 11 are illustrated in a simplified manner.

The lengthwise direction dimension of the stated side surface 7e was set at 2 mm. Meanwhile, the dimension, along the stated lengthwise direction, of the part of the ventilation hole 7d that opens into the side surface 7e was set at 0.1 mm. In FIG. 8, the center position, in the lengthwise direction, of the part of the ventilation hole 7d that opens into the side surface 7e is provided in a center position of the side surface 7e in the lengthwise direction. Accordingly, the first working example illustrated in FIG. 8 corresponds to a lengthwise direction position of 0 μm in FIG. 7.

Note that with respect to the part of the ventilation hole 7d that opens into the side surface 7e, a location that is furthest from the center of the stated lengthwise direction in the side surface 7e, which serves as the first side surface, is taken as an outer side end portion 5a. On the other hand, a location that is closest to the center of the stated lengthwise direction in the side surface 7e is taken as an inner side end portion 5b.

Although the positions of the outer side end portion 5a in the connecting members 5 and 5 are not particularly limited, in the first working example, those positions are the same as the positions of the respective end portions of the side surface 7e in the lengthwise direction.

Figure 9:
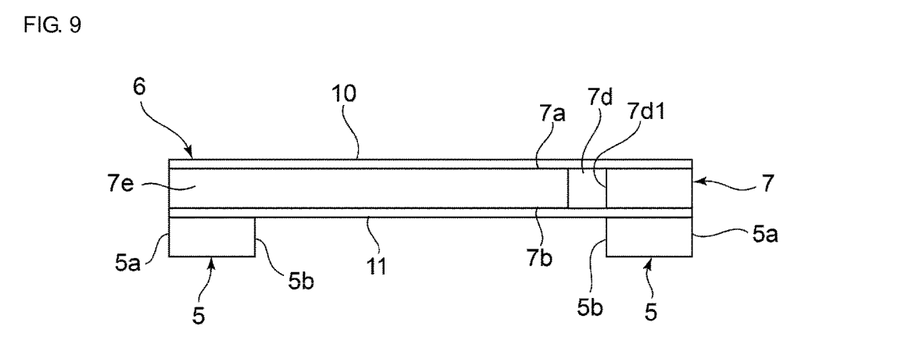
FIG. 9 is a side view illustrating a positional relationship between a ventilation hole and connecting members in a lengthwise direction of a first side surface of a frame body according to a comparative example.

FIG. 9 is a diagram illustrating a positional relationship between the ventilation hole 7d and the connecting members 5 and 5 in the lengthwise direction of the side surface 7e of the frame body 7, according to a comparative example. The comparative example differs from the first working example only in terms of the position of the part of the ventilation hole 7d that opens into the side surface 7e, which corresponds to a lengthwise direction position of 650 μm in FIG. 7. As illustrated in FIG. 9, in the comparative example, when viewing the ultrasonic wave generation apparatus in plan view, in the side surface 7e, an outer side end portion 7d1, in the lengthwise direction, of the part of the ventilation hole 7d that opens into the side surface 7e matches the inner side end portion 5b, in the lengthwise direction, of the connecting member 5 located therebelow.

As is clear from FIG. 7, the stress acting on the frame body 7 varies greatly as the stated lengthwise direction position varies. It can be seen that the stress acting on the frame body 7 is greatest, resulting in a drop in durability, in the case where the lengthwise direction position is 650 μm, or in other words, in the comparative example illustrated in FIG. 9. Accordingly, when viewing the ultrasonic wave generation apparatus 1 in plan view, it is necessary for the outer side end portion 7d1 of the ventilation hole 7d to be in a position, in the side surface 7e, that does not overlap with the inner side end portion 5b of the connecting member 5. Through this, a drop in durability can be prevented even when the ventilation hole 7d is provided.

On the other hand, in the first working example that corresponds to a case where the lengthwise direction position is 0 μm, when viewing the ultrasonic wave generation apparatus 1 in plan view, the outer side end portion 7d1 of the ventilation hole 7d is in a position, in the side surface 7e, that does not overlap with the inner side end portion 5b of the connecting member 5; as such, a lower amount of stress acts on the frame body 7 and the durability does not drop as compared to the comparative example.

Meanwhile, in the case where the lengthwise direction position is 400 μm, when viewing the ultrasonic wave generation apparatus 1 in plan view, the part of the ventilation hole 7d that opens into the side surface 7e is provided in a position, in the side surface 7e, that is different from a central area of the side surface 7e in the lengthwise direction, and thus does not overlap with the connecting member 5 located therebelow. To rephrase, in the case where the lengthwise direction position is 400 μm, when viewing the ultrasonic wave generation apparatus 1 in plan view, in the side surface 7e, the outer side end portion 7d1, in the lengthwise direction, of the part of the ventilation hole 7d that opens into the side surface 7e is in a position that does not overlap with the inner side end portion 5b, in the lengthwise direction, of the connecting member 5 located therebelow and a position further toward the center in the lengthwise direction than the inner side end portion 5b. As is clear from FIG. 7, in the case where the lengthwise direction position is 400 μm, when viewing the ultrasonic wave generation apparatus 1 in plan view, the outer side end portion 7d1 of the ventilation hole 7d does not overlap with the inner side end portion 5b of the connecting member 5 in the side surface 7e; as such, a lower amount of stress acts on the frame body 7 and the durability does not drop as compared to the comparative example. Furthermore, a lower amount of stress acts on the frame body 7 and there is almost no drop in durability as compared to the first working example.

Figure 10:
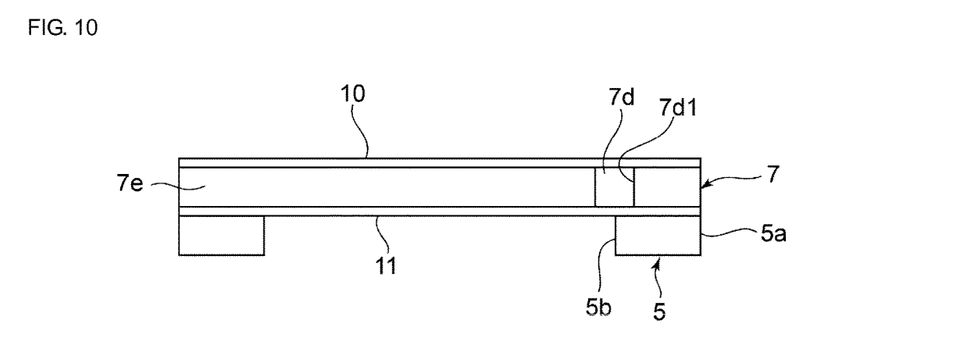
FIG. 10 is a side view illustrating a positional relationship between a ventilation hole and connecting members in a lengthwise direction of a first side surface of a frame body according to a second working example of the present invention.

FIG. 10 is a diagram illustrating a positional relationship between the ventilation hole 7d and connecting members 5 and 5 in the lengthwise direction of the side surface 7e of the frame body 7, according to a second working example. The second working example differs from the first working example only in terms of the position of the part of the ventilation hole 7d that opens into the side surface 7e, which corresponds to a lengthwise direction position of 700 μm in FIG. 7. As illustrated in FIG. 10, in the second working example, when viewing the ultrasonic wave generation apparatus 1 in plan view, in the side surface 7e, the part of the ventilation hole 7d that opens into the side surface 7e is provided in a position that is different from a central area of the side surface 7e in the lengthwise direction, and partially overlaps with the connecting member 5 located therebelow. To rephrase, in the second working example, when viewing the ultrasonic wave generation apparatus 1 in plan view, in the side surface 7e, the outer side end portion 7d1, in the lengthwise direction, of the part of the ventilation hole 7d that opens into the side surface 7e does not overlap with the inner side end portion 5b, in the lengthwise direction, of the connecting member 5 located therebelow, and is in a position between the outer side end portion 5a and the inner side end portion 5b.

In the second working example that corresponds to a case where the lengthwise direction position is 700 μm, when viewing the ultrasonic wave generation apparatus 1 in plan view, the outer side end portion 7d1 of the ventilation hole 7d does not overlap with the inner side end portion 5b of the connecting member 5 in the side surface 7e; as such, a lower amount of stress acts on the frame body 7 as compared to the comparative example, as indicated in FIG. 7. Accordingly, it can be seen that the durability does not drop.

Figure 11:
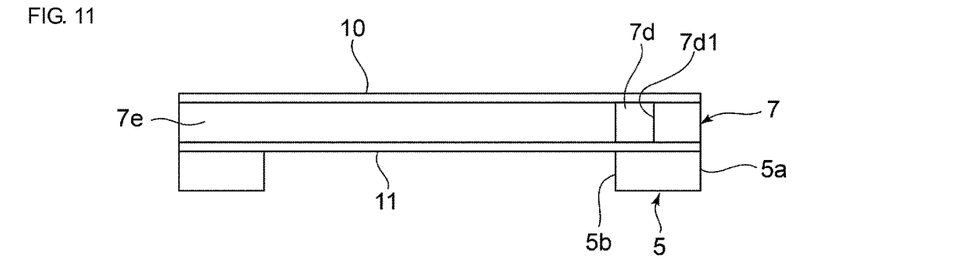
FIG. 11 is a side view illustrating a positional relationship between a ventilation hole and connecting members in a lengthwise direction of a first side surface of a frame body according to a third working example of the present invention.

FIG. 11 is a diagram illustrating a positional relationship between the ventilation hole 7d and connecting members 5 and 5 in the lengthwise direction of the side surface 7e of the frame body 7, according to a third working example. The third working example differs from the first working example only in terms of the position of the part of the ventilation hole 7d that opens into the side surface 7e, which corresponds to a lengthwise direction position of 750 μm in FIG. 7. As illustrated in FIG. 11, in the third working example, when viewing the ultrasonic wave generation apparatus 1 in plan view, in the side surface 7e, the part of the ventilation hole 7d that opens into the side surface 7e is provided in a position that is different from a central area of the side surface 7e in the lengthwise direction. To be more specific, the ventilation hole 7d is provided so that the part of the ventilation hole 7d that opens into the side surface 7e is covered by the connecting member 5 located therebelow when viewed from below. To rephrase, in the third working example, when viewing the ultrasonic wave generation apparatus 1 in plan view, in the side surface 7e, the outer side end portion 7d1, in the lengthwise direction, of the part of the ventilation hole 7d that opens into the side surface 7e does not overlap with the inner side end portion 5b, in the lengthwise direction, of the connecting member 5 located therebelow, and is in a position between the outer side end portion 5a and the inner side end portion 5b.

As is clear from FIG. 7, in the third working example that corresponds to a case where the lengthwise direction position is 750 μm, when viewing the ultrasonic wave generation apparatus 1 in plan view, in the side surface 7e, the part of the ventilation hole 7d that opens into the side surface 7e is provided in a region in a different position from the central area of the side surface 7e in the lengthwise direction and in a position where the connecting member 5 is located therebelow, as in the aforementioned embodiment; the outer side end portion 7d1 of the ventilation hole 7d does not overlap with the inner side end portion 5b of the connecting member 5, and thus the stress acting on the frame body 7 becomes extremely small and there is almost no drop in durability.

As described above, by setting the lengthwise direction position of the ventilation hole 7d to the aforementioned specific relationship, a drop in durability can be suppressed with certainty as compared to the comparative example illustrated in FIG. 9.

Figure 12A:
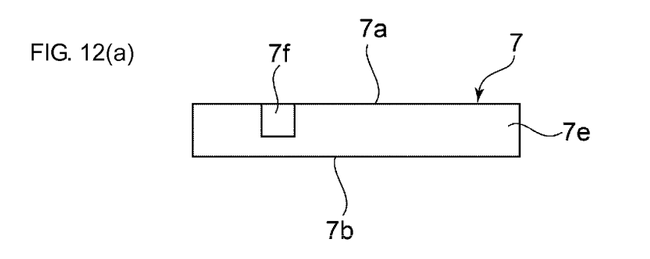
Figure 12B:
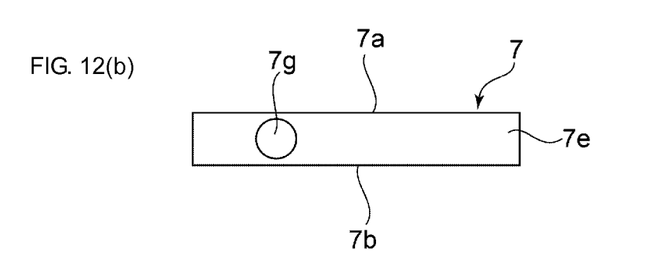
Figure 12C:
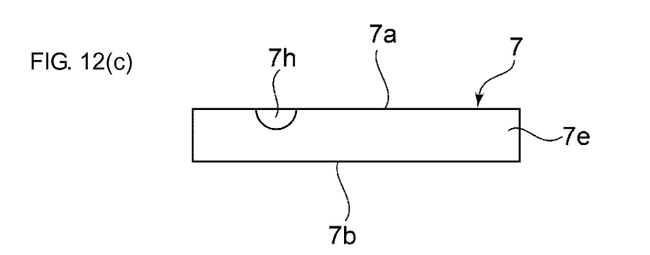
Figure 12D:
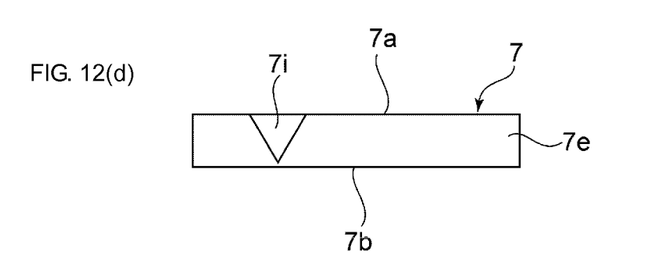

Although in the aforementioned embodiment, the ventilation hole 7d is provided so as to penetrate from the first main surface 7a to the second main surface 7b of the frame body 7 as indicated in FIG. 4, the shape of the ventilation hole is not particularly limited. For example, the ventilation hole may be formed having a part that opens into the side surface 7e as a groove 7f whose horizontal cross-section is rectangular, with an opening only on the first main surface 7a side of the frame body 7, as illustrated in FIG. 12(a). Furthermore, the ventilation hole may be formed having a part that opens into the side surface 7e as a hollow passage 7g, without having an opening in the first main surface 7a and the second main surface 7b of the frame body 7, as illustrated in FIG. 12(b). Further still, the ventilation hole may be formed having a part that opens into the side surface 7e as a groove 7h whose horizontal cross-section is semi-circular, a groove 7i whose horizontal cross-section is V-shaped, or the like, with an opening only on the first main surface 7a side of the frame body 7, as illustrated in FIGS. 12(c) and (d).

In addition, in the ultrasonic wave generation apparatus according to the present invention, resonance occurs within the ventilation hole 7d as well. In the case where a frequency of the resonance in the ventilation hole 7d matches a frequency of resonance, produced by sonic waves emitted due to the vibration of the first and second piezoelectric vibrators 10 and 11, that takes the sonic wave emission openings 3a to 3d as open ends, the resonances will interfere with each other within the housing, resulting in a drop in the sound pressure of the ultrasonic waves emitted from the ultrasonic wave generation apparatus. Accordingly, it is preferable that the frequency of the resonance in the ventilation hole 7d be different from the frequency of resonance, produced by sonic waves emitted due to the vibration of the first and second piezoelectric vibrators 10 and 11, that takes the sonic wave emission openings 3a to 3d as open ends. As a result, a drop in the sound pressure of the ultrasonic waves emitted from the ultrasonic wave generation apparatus caused by resonance within the ventilation hole 7d can be reduced. Note that the frequency of the resonance is the frequency of a sound pressure peak.

In the present invention, to provide the characteristic positional relationship for the ventilation hole provided in the frame body as described above, the stated first and second piezoelectric vibrators 10 and 11 are not limited to bimorph-type piezoelectric vibrators, and may be piezoelectric vibrators having other structures such as unimorph types.

In addition, in the present invention, the stated ultrasonic wave generation element 6 and connecting members 5 are required constituent elements, and the package structure is not limited to that described in the aforementioned embodiment.

REFERENCE SIGNS LIST

1 . . . ultrasonic wave generation apparatus
2 . . . base board
2a . . . top surface
3 . . . cap member
3a to 3d . . . sonic wave emission opening
4 . . . electrode land
5 . . . connecting member
5a . . . outer side end portion
5b . . . inner side end portion
6 . . . ultrasonic wave generation element
7 . . . frame body
7a, 7b . . . first and second main surfaces
7c . . . through-hole
7d . . . ventilation hole
7d1 . . . outer side end portion
7e . . . side surface
7f . . . groove
7g . . . hollow passage
7h . . . groove
7i . . . groove
8, 9 . . . adhesive layer
10, 11 . . . first and second piezoelectric vibrators
10a, 11a . . . piezoelectric plate
10b, 11b . . . inner electrode
10c, 10d, 11c, 11d . . . exciting electrode
12 . . . conductive adhesive

The invention claimed is:

1. An ultrasonic wave generation apparatus comprising:
an ultrasonic wave generation element including:
a frame body having first and second main surfaces that are opposite to each other, a plurality of side surfaces connecting the first and second main surfaces to each other, and one of a groove or a through-hole provided in the first and second main surfaces to define an inner space,
a first vibrator having a first surface adjacent the first main surface of the frame body so as to cover the groove or the through-hole on the first main surface of the frame body, and a second surface opposite the first surface,
a second vibrator having a third surface adjacent the second main surface of the frame body so as to cover the groove or the through-hole on the second main surface of the frame body, and a fourth surface opposite the third surface, and
a ventilation hole in a first side surface of the plurality of side surfaces and that opens to the inner space, the ventilation hole having an inner side end portion proximal to a center of the first side surface and an outer side end portion proximal to an end of the first side surface; and
a connecting member bonded to the fourth surface of the second vibrator opposite to the third surface of the second vibrator, supporting the ultrasonic wave generation element, and electrically connected to at least one of the first and second vibrators, the connecting member having an inner end proximal to the center of the first side surface and an outer end proximal to an end of the first side surface,
wherein, when viewed in a plan view of the ultrasonic wave generation apparatus, the outer side end portion of the ventilation hole does not overlap with the inner end of the connecting member.

2. The ultrasonic wave generation apparatus according to claim 1, wherein the ventilation hole is positioned so that, when viewed in the plan view, the outer side end portion of ventilation hole is not in the center of the first side surface and does not overlap with the inner end of the connecting member.

3. The ultrasonic wave generation apparatus according to claim 1, wherein the ventilation hole is positioned so that an inner side end portion of the ventilation hole overlaps with the connecting member.

4. The ultrasonic wave generation apparatus according to claim 1, further comprising:
a housing that houses the ultrasonic wave generation element and that has a sonic wave emission opening.

5. The ultrasonic wave generation apparatus according to claim 4, wherein a first frequency of a resonance within the ventilation hole is different from a second frequency of resonance produced by sonic waves emitted due to vibration of the first and second vibrators.

6. The ultrasonic wave generation apparatus according to claim 1, wherein the ultrasonic wave generation element is configured to generate ultrasonic waves in a buckling tuning-fork vibration mode in which the first vibrator and the second vibrator vibrate at opposite phases.

7. The ultrasonic wave generation apparatus according to claim 1, wherein the ventilation hole has a rectangular horizontal cross-section.

8. The ultrasonic wave generation apparatus according to claim 7, wherein the groove is only on the first main surface of the frame body.

9. The ultrasonic wave generation apparatus according to claim 1, wherein the ventilation hole is a hollow passage that opens into the first side surface without having an opening in the first main surface and the second main surface of the frame body.

10. The ultrasonic wave generation apparatus according to claim 1, wherein the ventilation hole is a channel that opens onto only one of the first main surface and the second main surface of the frame body.

11. The ultrasonic wave generation apparatus according to claim 10, wherein the channel has a semicircular horizontal cross-section.

12. The ultrasonic wave generation apparatus according to claim 11, wherein the channel is only on the first main surface of the frame body.

13. The ultrasonic wave generation apparatus according to claim 10, wherein the channel has a V-shaped horizontal cross-section.

14. The ultrasonic wave generation apparatus according to claim 13, wherein the channel is only on the first main surface of the frame body.

* * * * *